Patented Oct. 22, 1929

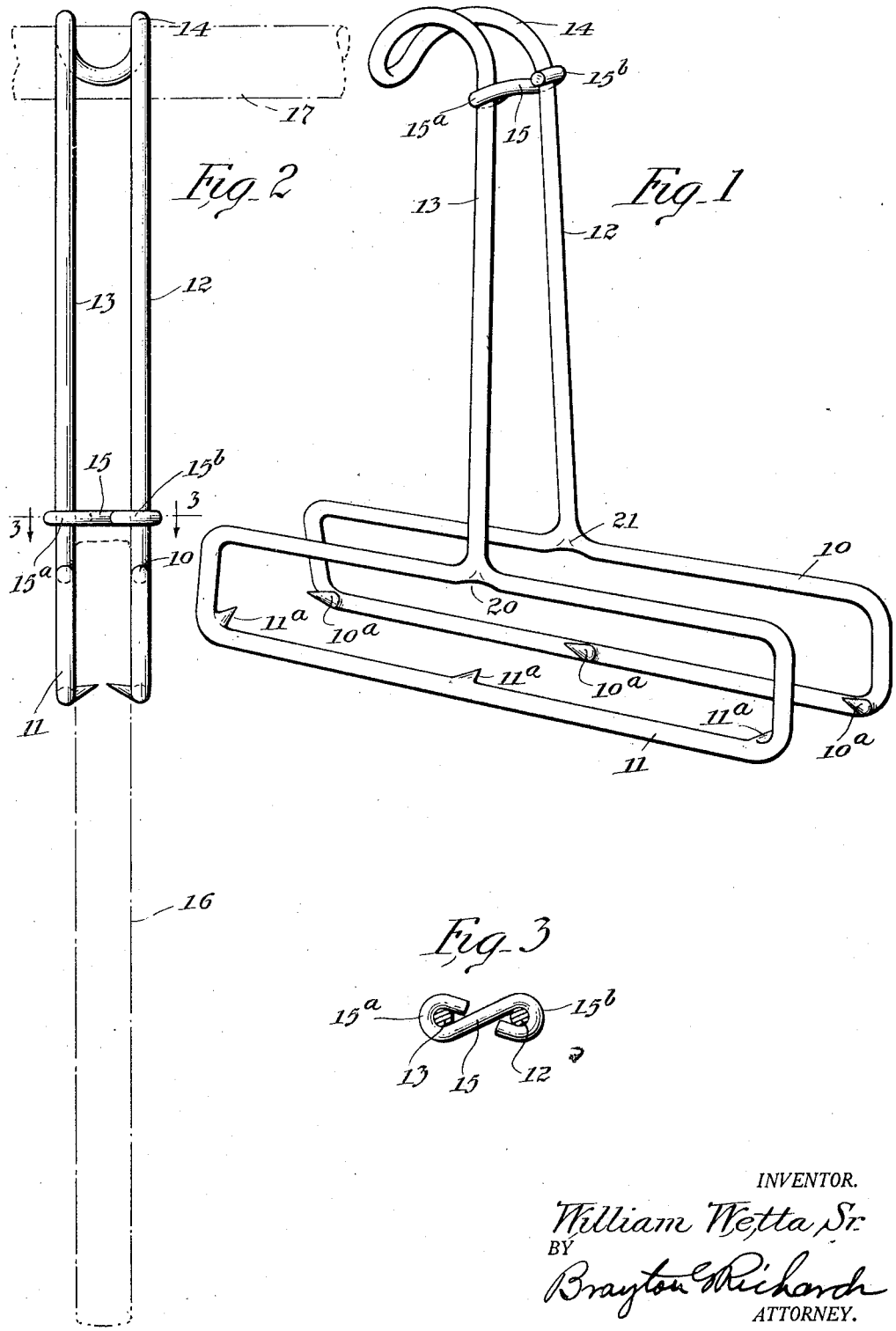

1,732,960

UNITED STATES PATENT OFFICE

WILLIAM WETTA, SR., OF HARRISON, OHIO

BACON HANGER

Application filed June 19, 1926. Serial No. 117,040.

This invention relates to a bacon hanger designed to be employed in packing houses for the purpose of securing bacon and other similar meats in a pendant position during the curing thereof.

In all curing operations, such as smoking and the like, it is necessary to provide some means for hanging the meat in position during the operation. Some difficulty is encountered in properly securing the meat during these operations, because a shrinking in size of the meat is incidental to the curing thereof, and any instrumentality employed for securing the meat in a hanging position must be such that it will not let go after the curing operation is partly under way and the bacon or other meat has shrunk in size.

The instruments heretofore used are of such a nature that they have prongs extending through the meat, several different forms being employed, among them an ordinary single hook. The most common instrument, however, has been made somewhat in the form of a rake with the prongs thereof sharpened, and the handle portion being abbreviated and terminating in a hanger. The prong portions are then forced through the body of meat to be smoked, and accordingly no subsequent shrinking of the meat will have the effect of permitting a separation of the hanging members from the meat.

All of these instrumentalities, however, are faulty in that they require considerable time to attach; they leave holes in the meat after it has been cured and smoked, and they require the handling of the meat with the hands both before curing, for the purpose of fastening, and after curing for the purpose of releasing.

The object of the present invention is to provide an improved type of hanger which is positive in its gripping action, adjusts itself to the thickness of the meat, does not require that the meat be handled with the human hands, and does not leave holes extending through the body of the meat.

The improved instrument comprises two gripping portions associated with a spring tending to force them apart, the spring being of the same material as the gripping members and terminating in a hanger. On the face of the gripping members are a plurality of sharp projections, designed to extend partially into the meat to more thoroughly grip the same. A sliding member rides on the spring portion which is associated with the two gripping members and is designed to be extended downwardly to bring the two members closer together, or raised to permit their separation. The sharp projections in the gripping members, and the weight of the sliding member, co-operate to keep the meat in a secure position during the shrinking thereof incidental to curing.

Other objects and features of the invention will become more apparent from a consideration of the following detailed description, taken with the accompanying drawing, in which Figure 1 is a perspective view of my improved bacon hanger, with the gripping members thereof in a distended position;

Figure 2 an end view of the same shown in position of use; and

Figure 3 a section taken substantially on line 3—3 of Fig. 2.

Referring now to the accompanying drawings, in which like reference characters are employed throughout to designate similar members, the improved bacon hanger comprises gripping members designated generally by the reference characters 10 and 11 respectively, and a spring member secured to both of said gripping members and formed of the same material, said spring member comprising two uprights designated 12 and 13 and secured to the gripping members 10 and 11 respectively. The uprights 12 and 13 are formed of a continuous metal rod and together terminate, as shown, in the form of a large hook 14. A keeper or sliding member 15, configurated as shown in Figure 4, comprises links 15$^a$ and 15$^b$ designed to encircle the uprights 13 and 12. On the inner faces of the gripping members 10 and 11 are a plurality of sharp projections 10$^a$ and 11$^a$ respectively, three of such projections being shown on each one of the members 10 and 11, but obviously more or less thereof can be employed, as desired.

The keeper 15 is designed to ride on the uprights 12 and 13 in the manner indicated to permit a separation of the gripping members 10 and 11, or to draw said members 10 and 11 together, as desired. The member 15 is made sufficiently heavy so that it will at all times tend to drop to a downward position of its own weight. In actual use, this tendency is aided by the shape and direction of extension of the projections 10ª and 11ª. It will be seen from a consideration of the figures that although these projections extend generally inwardly, they also extend slightly upwardly. The weight of a bacon slab on the instrument when the projections 10ª and 11ª extend thereinto, has a tendency to pull the gripping members 10 and 11 toward each other. As described, this action is also aided by the tendency of the keeper 15 to drop due to its own weight.

When employing the bacon hanger, it is simply necessary to spread the gripping members 10 and 11 sufficiently far apart so that they may be extended over the end of the slab of bacon 16. The keeper 15 is then forced as far downwardly, or in the direction of the gripping members 10 and 11, as is readily possible. The slab of bacon is then picked up by means of the bacon hanger itself, and the hook portion 14 extended over a suitable rod 17, or other member to which it might be desirable to hang the bacon. It is assumed that the rod 17 is in a smoke house or other curing room where smoking or similar treatment is given. Incidental to the smoking, the bacon 16 is caused to shrink, and as the bacon shrinks the keeper 15 falls of its own weight and the members 10 and 11 are brought closer together in the manner described.

When the bacon 16 has been entirely cured, it is removed from the smoke house, and may be handled entirely by means of the bacon hanger without the necessity of touching the bacon 16 with the hands. The keeper 15 is then pulled upwardly, thus causing the gripping members 10 and 11 to become separated and the projections 10ª and 11ª to be removed from the body of the slab of bacon. The bacon hanger is withdrawn, whereupon it is immediately ready to do duty with the fresh or partly cured slab of bacon, and the slab 16 is ready for further process or shipping, as the case may be.

I prefer to form the entire bacon hanger, with the exception of the keeper 15, integrally, the uprights 12 and 13 being welded or otherwise permanently secured to the gripping members 10 and 11, and the projections 10ª and 11ª being entirely integral with the gripping members 10 and 11. A good form of construction is to make the entire instrument from a single fairly heavy spring steel rod, the rod being bent in a plurality of places to form the gripping members 10 and 11, and the two ends being welded to the meat portion of the rod at the intersections thereof 20 and 21. The extensions 10ª and 11ª are formed separately and are welded to the gripping members 10 and 11, said projections 10ª and 11ª being subsequently ground or otherwise brought to a sharp point. The keeper 15 may be either preliminarily formed and placed on the uprights 12 and 13 before the rod has been completely bent, or preferably after the main portion of the bacon hanger is made the keeper 15 is bent around the uprights 12 and 13.

I have shown in the drawings what appears to me at the present time to be the most desirable form for the invention to take for rough usage in a packing house. It is obvious, however, that it may take other forms which might in the long run prove to be more desirable than that shown. I do not wish to limit myself therefore to the precise structure shown and described, but only in so far as defined by the scope of the appended claim.

I claim:

A bacon hanger comprising an integral rod of spring steel bent to form a pair of opposed rectangular gripping members and a spring member comprising a pair of uprights having an extension of arcuate configuration to provide an integral two-strand hook, one upright leading to each gripping member, the spreading of said gripping members residing in the integral section of said hook, the ends of said rod terminating in each instance at the joint between said upright members and said gripping members and being welded at this point, a keeper having two links slidable on said upright members, and a plurality of projections on the inner faces of said gripping members.

WILLIAM WETTA, Sr.